(12) United States Patent
Lentz

(10) Patent No.: US 9,174,653 B2
(45) Date of Patent: Nov. 3, 2015

(54) METHOD FOR PROVIDING VEHICLE CONFIGURATIONS

(71) Applicant: Nikolas Lentz, Ilsfeld (DE)

(72) Inventor: Nikolas Lentz, Ilsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/208,208

(22) Filed: Mar. 13, 2014

(65) Prior Publication Data

US 2014/0277919 A1   Sep. 18, 2014

(30) Foreign Application Priority Data

Mar. 18, 2013   (DE) .......................... 10 2013 204 727

(51) Int. Cl.
*B60W 50/08* (2012.01)

(52) U.S. Cl.
CPC .................................. *B60W 50/082* (2013.01)

(58) Field of Classification Search
CPC .......................... B60W 50/082; B60W 30/182
USPC ....................................... 701/32.4, 29.1, 32.3
See application file for complete search history.

(56) References Cited

U.S. PATENT DOCUMENTS

| | | | |
|---|---|---|---|
| 2007/0032913 A1* | 2/2007 | Ghoneim et al. | 701/1 |
| 2009/0150036 A1* | 6/2009 | Craig | 701/80 |
| 2010/0277287 A1 | 11/2010 | Choi | |
| 2012/0253594 A1* | 10/2012 | Schreiber | 701/36 |
| 2014/0046518 A1* | 2/2014 | Roos et al. | 701/22 |

FOREIGN PATENT DOCUMENTS

| | | | |
|---|---|---|---|
| DE | 10 2004 020 110 | 11/2005 | |
| EP | 0745965 | 12/1996 | |
| GB | 2353872 | 3/2001 | |
| GB | 2353872 A * | 3/2001 | B60K 31/00 |
| GB | 2390438 | 1/2004 | |
| WO | WO2007090896 | 8/2007 | |
| WO | WO 2007090896 A1 * | 8/2007 | |
| WO | WO/2012/126098 | 9/2012 | |

* cited by examiner

*Primary Examiner* — Mary Cheung
*Assistant Examiner* — Brian P Sweeney
(74) *Attorney, Agent, or Firm* — Kenyon & Kenyon LLP

(57) ABSTRACT

A method for providing vehicle configurations, the providing of at least one vehicle configuration is a function of a local position of the vehicle.

10 Claims, 4 Drawing Sheets

METHOD FOR PROVIDING VEHICLE CONFIGURATIONS

RELATED APPLICATION INFORMATION

The present application claims priority to and the benefit of German patent application no. 10 2013 204 727.4, which was filed in Germany on Mar. 18, 2013, the disclosure of which is incorporated herein by reference.

FIELD OF THE INVENTION

The present invention relates to a method for providing vehicle configurations according to the definition of the species in the independent claims. Modern vehicles, particularly sports cars, are frequently subject to legal provisions which clearly reduce the performance of the internal combustion engine, for example. These legal provisions often do not apply, however, for operation on private territory. For that reason, sports cars are frequently offered with two different operating modes, one normal operating mode which distinguishes itself by all settings of the vehicle conforming to the law, and a sports mode which distinguishes itself by the settings, such as characteristic curves of an engine control, not being tied to legal specifications. In this case, a prerequisite for operating in the sports mode is that the vehicle is located on nonpublic territory, such as a private racetrack.

BACKGROUND INFORMATION

German document DE 2004 020 110 A1 discusses a method for adjusting the travel behavior of motor vehicles. In this context, completely independent controls are provided, for one thing, for use in daily street traffic, and for another thing when travel is on racetracks. The so-called sports mode is activated by the driver, in this case, via a corresponding operating element.

SUMMARY OF THE INVENTION

By contrast, the method according to the present invention, having the features of the independent claims, has the advantage that providing vehicle configurations is the function of a local position of the vehicle. Consequently,it may be ensured that providing legally nonconforming vehicle configurations takes place only if the local position of the vehicle permits it.

Advantageous further refinements of, and improvements to the method set forth in the independent claim are made possible by the measures delineated in the dependent claims.

It is advantageous if the vehicle configurations provided are configurations that are not permitted in public road traffic.

It is particularly advantageous if the vehicle configurations provided are configurations for control units, particularly an engine control, a transmission control, a wheel-suspension control and/or a control of an electronic stability program, since these vehicle configurations may be quickly converted.

It is particularly advantageous if the vehicle configurations are provided when the localization of the vehicle yields the fact that the vehicle is located on a territory that is not to be assigned to public road traffic. Consequently, it may be ensured that no violation of the law issues from possibly providing vehicle configurations not conforming to the law.

It is particularly advantageous if the localization of the vehicle is undertaken via a radio-based localization method, since in that manner the localization is able to take place in automatic fashion.

It is advantageous if the radio-based localization method is a satellite navigation method and/or a terrestrial radio localization method. Thus, components already present in the vehicle may be used for the position finding.

It is particularly advantageous if the terrestrial radio position finding method is a method which recognizes the position of the vehicle on a territory that is not assigned to public road traffic, in that the vehicle passes an area in which the radio position finding is undertaken, particularly by an RFID chip.

It is of advantage if the territory, that is not assignable to public road traffic, is a racetrack.

Of further advantage is a computer program that is developed to carry out each step of the method according to the present invention.

Additionally advantageous is an electronic storage medium on which the corresponding computer program is stored, as well as an electronic control unit which includes the electronic storage medium.

An exemplary embodiment of the present invention is explained in detail below, with reference to the accompanying drawings. The figures show:

DETAILED DESCRIPTION

Two exemplary embodiments of the present invention will be explained in greater detail below on the basis of the drawings.

Figure 1:
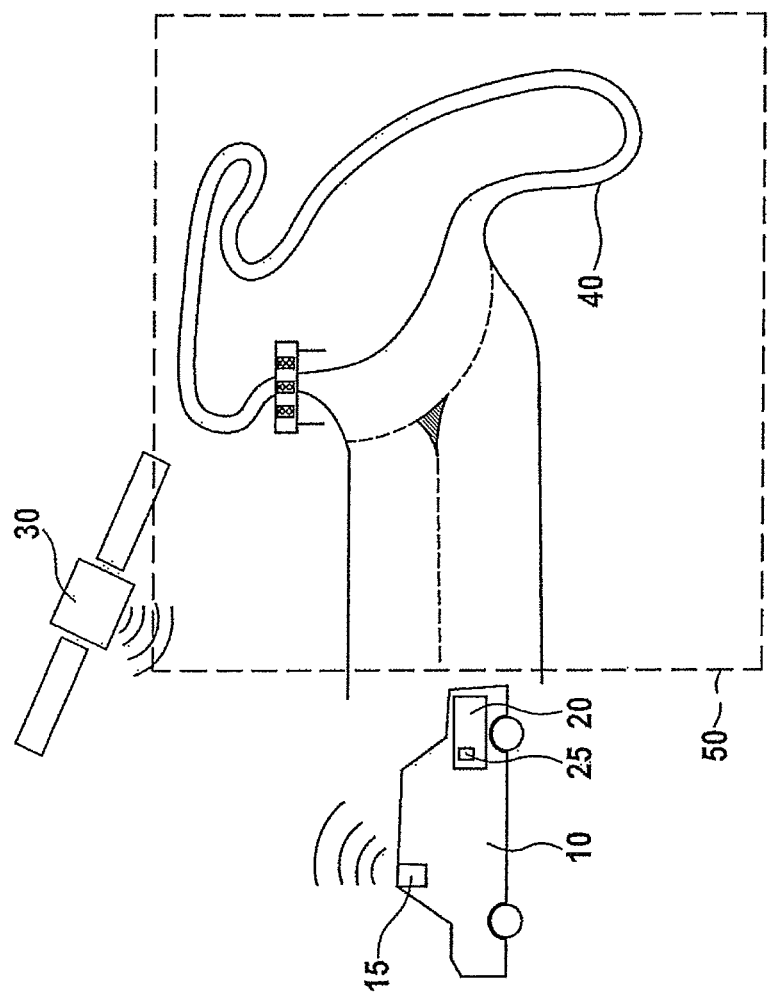
FIG. 1 shows a schematic illustration of a vehicle and a racetrack according to a first exemplary embodiment of the present invention.

FIG. 1 shows a schematic representation of a vehicle 10 and a racetrack 40 according to a first exemplary embodiment of the present invention.

Vehicle 10 has an internal combustion engine 20 and an engine control 25. Furthermore, there is a satellite navigation unit 15 on the vehicle, such as a GPS module, which, via a radio connection, is in connection to one or more navigation satellites 30 and thus enables the position finding of the vehicle, in a manner known to one skilled in the art. Racetrack 40 is located in a positioning area 50, which is distinguished in that racetrack 40 is completely within positioning area 50 and within positioning area 50 there are no roads assigned to public road traffic.

Figure 2:
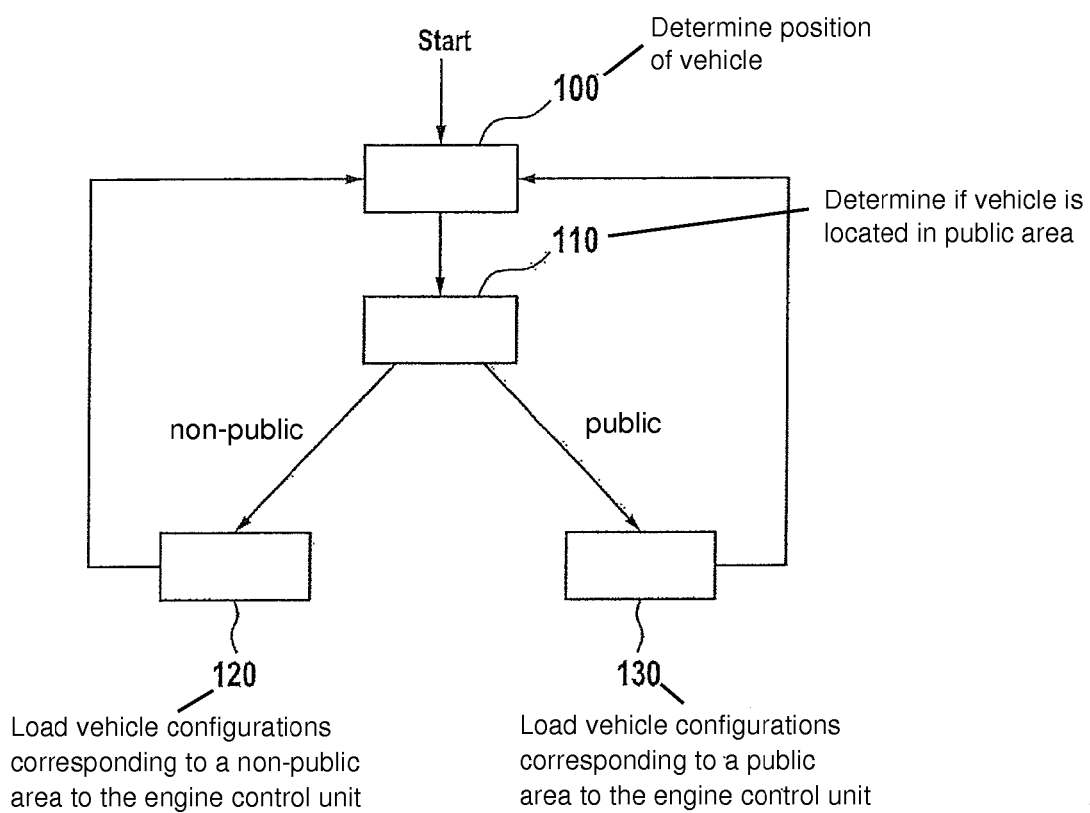
FIG. 2 shows a schematic representation of the method according to the present invention, according to a first embodiment of the present invention.

FIG. 2 shows a schematic representation of the method according to the present invention, according to a first specific embodiment.

After the start, in step 100, the position of vehicle 10 is determined using the satellite navigation method, in the manner known to one skilled in the art. Step 110 is carried out after that.

In step 110 it is checked whether the position of vehicle 10 is located in the public area or not. In this context, public area at this point means the validity of a certain legislation, such as an exhaust gas legislation or a road traffic ordinance, such as the StVO that applies in Germany. In an analogous fashion, in this connection, an area that is not assigned to the validity of a certain legislation, such as an exhaust gas legislation or the StVO, is not designated as a public area. The assignment of the position of vehicle configuration to the public or the non-public area takes place, for example, in that the position of vehicle 10 is compared to a data bank in which positioning area 50 is stored, Since positioning area 50 marks an outer limit of the non-public area, a vehicle that is located within positioning area 50 is located in the non-public area, This procedure has the advantage that even in the case of changes in racetrack 40, the data bank in which positioning area 50 is stored, does not have to be updated, and it may consequently be ensured that the position of vehicle 10 is able to be assigned to a public or a non-public area. If the test shows that vehicle 10 is not located in the public area, the system continues with step 120. If the test of the position shows that vehicle 10 is located in the public area, the system continues with step 130.

In step 120, vehicle configurations are loaded by the engine control unit, which correspond to operation of vehicle 10 in a non-public area. Such an operation may be an operation of vehicle 10 in a sports mode. In this context, operation in sports mode may include, for instance, certain characteristic curves of an engine control, certain configurations for a transmission control, certain configurations for an electronic stability program, etc. After that, the system returns to step 100.

In step 130, those vehicle configurations are loaded which conform to the law, and are therefore suitable for the operation of the vehicle in a public area, that is, having the validity of, for instance, an exhaust gas legislation or a road traffic ordinance. The program subsequently returns to a step 100.

The present, first exemplary embodiment of the method according to the present invention is thus run through again and again in a loop. The first exemplary embodiment of the method according to the present invention is terminated by a signal which indicates the shutting down of internal combustion engine 20 and engine control unit 25, triggered by the operation of a switching arrangement or by the operation of an ignition key, for example.

Figure 3:
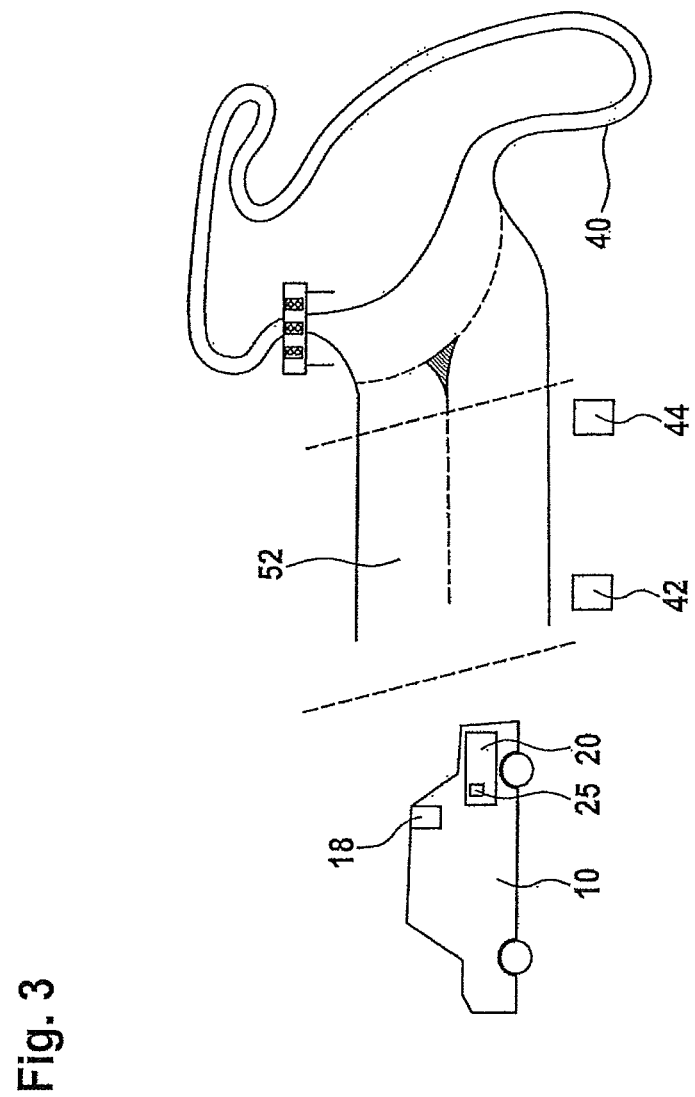
FIG. 3 shows a schematic illustration of a vehicle and a racetrack according to a second exemplary embodiment of the present invention.

FIG. 3 shows a schematic representation of a vehicle 10 and a racetrack 40 according to a first exemplary embodiment of the present invention.

In this context, vehicle 10 has a RFID reader 18 that is known to one skilled in the art, and racetrack 40 has two RFID chips 42 and 44, which are positioned in a borderline area 52 between the public and the non-public area, so that RFID chips 42 and 44 are detected and read out when vehicle 10 passes from the public into the non-public area, or vice versa. In this context, RFID chip 44 is located closer to the racetrack than RFID chip 42, so that when vehicle 10 passes from the public into the non-public area, first RFID chip 42 and, thereafter in time, RFID chip 44 is detected by RFID reader 18.

Figure 4:
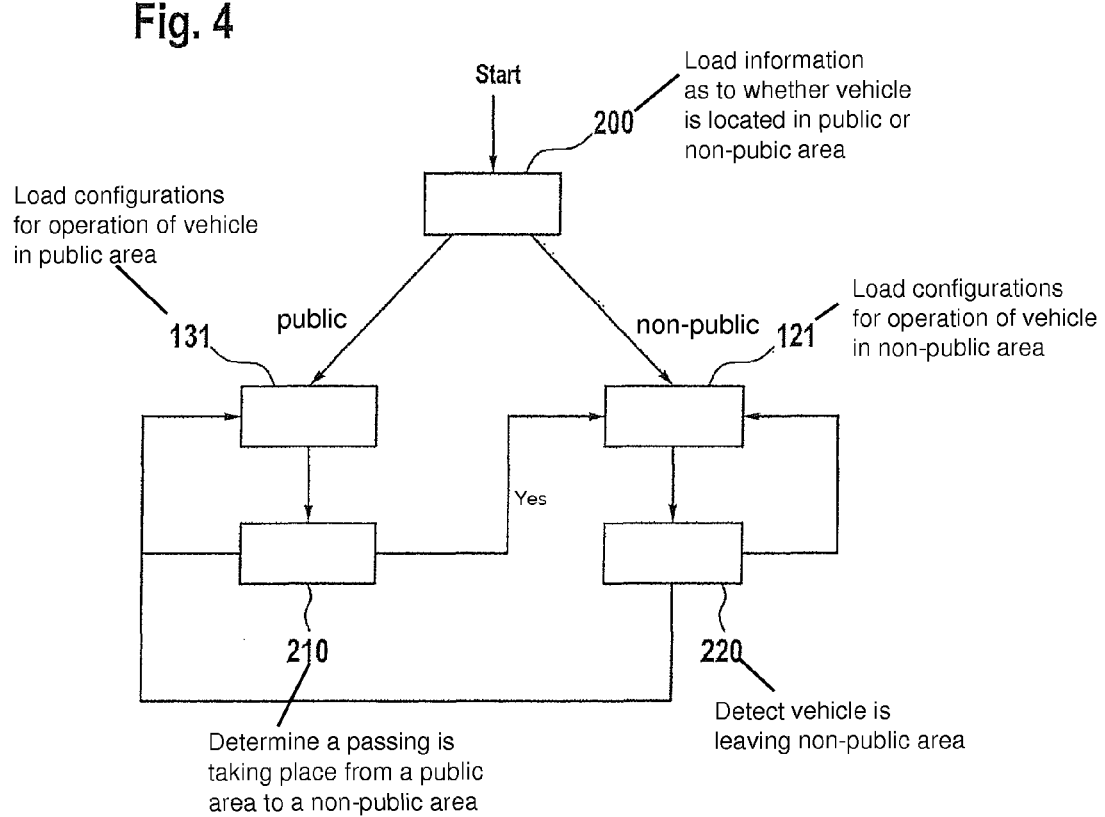
FIG. 4 shows a schematic representation of the method according to the present invention, according to a second embodiment of the present invention.

FIG. 4 shows a schematic representation of the method according to the present invention, according to the second specific embodiment.

In step 200, information is loaded from a memory, which is located in engine control unit 25, for example, as to whether the vehicle is located in a public or a non-public area. This information may be stored, for instance, in the form of a flag or a binary value. If the vehicle is located in the public area, the system continues with step 131. If the vehicle is located in the non-public area, the system continues with step 121.

In step 121, the vehicle configurations according to the sports mode are loaded. In addition, it is stored in a memory in the engine control unit that the vehicle is located in the non-public area, for instance, by setting a corresponding flag. Step 220 is carried out after that.

In step 220, RFID reader 18 attempts to detect RFID chips 42 and 44. With the aid of the sequence of detecting the two RFID chips 42 and 44, RFID reader 18 is not only able to determine the passing of the corresponding area by vehicle 10, but also the direction of the passing. If it is detected that the two RFID chips are being detected in the sequence of first chip 44 and then chip 42, it is concluded that the vehicle is leaving the non-public area, such as the racetrack. Step 131 is carried out after that. If it is not detected with the aid of the RFID chips that the vehicle is leaving the non-public area, step 121 is repeated subsequently to step 220.

In step 131, vehicle configurations are loaded which correspond to operation of vehicle 10 in a public area. This is, for example, about configurations which are carried out according to legislation such as exhaust gas legislation or a road traffic ordinance. In addition, it is stored in a memory in the engine control unit that the vehicle is located in the public area, for instance, by setting a corresponding flag. Step 210 is carried out after that.

In step 210, RFID reader 18 searches for signals of RFID chips 42 and 44. With the aid of the sequence of detecting the two RFID chips 42 and 44, RFID reader 18 is not only able to determine the passing of the corresponding area by vehicle 10, but also the direction of the passing. If, with the aid of the sequence of the signals of RFID chips 44 and 42, it is concluded that the passing of borderline area 52 is taking place from the public into the non-public space, step 121 is carried out subsequently to step 210. If it cannot be concluded that the passing is from the public into the non-public space, step 131 is repeated.

The present, second exemplary embodiment of the method according to the present invention is thus run through again and again in a loop. The second exemplary embodiment of the method according to the present invention is terminated by a signal which indicates the shutting down of internal combustion engine 20 and engine control unit 25, triggered by the operation of the switching arrangement or by the operation of an ignition key, for example.

What is claimed is:

1. A method for providing a vehicle configuration, the method comprising:
    determining, with a processor, (i) a local position of the vehicle and (ii) a type of legislation associated with an area of the determined local position; and
    providing, with the processor, at least one vehicle configuration as a function of the determined local position of the vehicle and the type of legislation associated with the area of the determined local position;
    wherein the at least one provided vehicle configuration is a configuration, corresponding to one type of legislation, which is not admitted in public road traffic.

2. The method of claim 1, wherein the at least one provided vehicle configuration is a configuration for control units, including at least one of an engine control, a transmission control, a wheel-suspension control and an electronic stability control.

3. A method for providing a vehicle configuration, the method comprising:
    determining, with a processor, (i) a local position of the vehicle and (ii) a type of legislation associated with an area of the determined local position; and
    providing, with the processor, at least one vehicle configuration as a function of the determined local position of the vehicle and the type of legislation associated with the area of the determined local position;
    wherein the at least one vehicle configuration is provided if a localization of the vehicle yields that the vehicle is located on a territory, corresponding to one type of legislation, that is not to be assigned to public road traffic.

4. The method of claim 3, wherein the localization of the vehicle is performed via a radio-based localization process.

5. The method of claim 4, wherein the radio-based localization method includes at least one of a satellite navigation and a terrestrial radio localization system.

6. The method of claim 5, wherein the terrestrial radio position finding process recognizes the position of the vehicle on a territory that is not assigned to public road traffic when the vehicle passes an area in which the radio position finding detects an RFID chip associated with the territory.

7. The method of claim 6, wherein the territory, that is not assigned to public road traffic, is a racetrack.

8. A non-transitory computer readable medium having a computer program, which is executable by a processor, comprising:
  a program code arrangement having program code for providing a vehicle configuration, by performing the following:
  determining (i) a local position of the vehicle and (ii) a type of legislation associated with an area of the determined local position; and
  providing at least one vehicle configuration as a function of the determined local position of the vehicle and the type of legislation associated with the area of the determined local position;
  wherein the at least one provided vehicle configuration is a configuration, corresponding to one type of legislation, which is not admitted in public road traffic.

9. The non-transitory computer readable medium of claim 8, wherein the at least one provided vehicle configuration is a configuration which is not admitted in public road traffic.

10. An electronic control unit, comprising:
  a non-transitory computer readable medium having a computer program, which is executable by a processor, including:
  a program code arrangement having program code for providing a vehicle configuration, by performing the following:
  determining (i) a local position of the vehicle and (ii) a type of legislation associated with an area of the determined local position; and
  providing at least one vehicle configuration as a function of the determined local position of the vehicle and the type of legislation associated with the area of the determined local position;
  wherein the at least one provided vehicle configuration is a configuration, corresponding to one type of legislation, which is not admitted in public road traffic.

* * * * *